United States Patent [19]

Meuschke et al.

[11] Patent Number: 4,511,499

[45] Date of Patent: Apr. 16, 1985

[54] APPARATUS FOR DISMANTLING AND DISPOSING OF FUEL ASSEMBLIES

[75] Inventors: Robert E. Meuschke, Penn Hills; Joseph R. Schulties, Gibsonia, both of Pa.

[73] Assignee: Westinghouse Electric Corp., Pittsburgh, Pa.

[21] Appl. No.: 359,552

[22] Filed: Mar. 18, 1982

[51] Int. Cl.³ .............................................. G21F 9/34
[52] U.S. Cl. ...................................... 252/626; 83/19; 83/23; 100/39; 376/261; 376/272
[58] Field of Search ............... 252/626, 627; 376/272, 376/261; 100/39; 83/19, 23

[56] References Cited

U.S. PATENT DOCUMENTS

| | | | |
|---|---|---|---|
| 3,180,249 | 4/1965 | Patros | 100/30 |
| 3,320,051 | 5/1967 | Lieberman | 75/43 |
| 3,367,019 | 2/1968 | Williamson | 29/403 |
| 3,606,808 | 9/1971 | Chazen | 83/23 |
| 3,763,770 | 10/1973 | Ehrman et al. | 100/39 |
| 4,056,052 | 11/1977 | Weil et al. | 100/39 |

FOREIGN PATENT DOCUMENTS 2730723  2/1978  Fed. Rep. of Germany ...... 252/626

OTHER PUBLICATIONS

Blanco et al., "Head-End Processes for Solid Fuel" in Stoller et al., Eds. Reactor Handbook, vol. II, Fuel Reprocessing, Interscience Publishers, N.Y., 1961, pp. 23–48.

Primary Examiner—Deborah L. Kyle
Attorney, Agent, or Firm—Daniel C. Abeles

[57] ABSTRACT

Method and apparatus for dismantling, shearing and compacting a fuel assembly frame skeleton. A frame is provided which can be placed into the transfer canal of a fuel-handling building for severing a bottom nozzle from the thimble tubes and grids of the frame skeleton, compacting the remainder of the skeleton, and then further severing the thimble tubes and grids into shorter longitudinal lengths, and placing the shortened compacted severed pieces into a container for off-site shipment or on-site storage.

3 Claims, 11 Drawing Figures

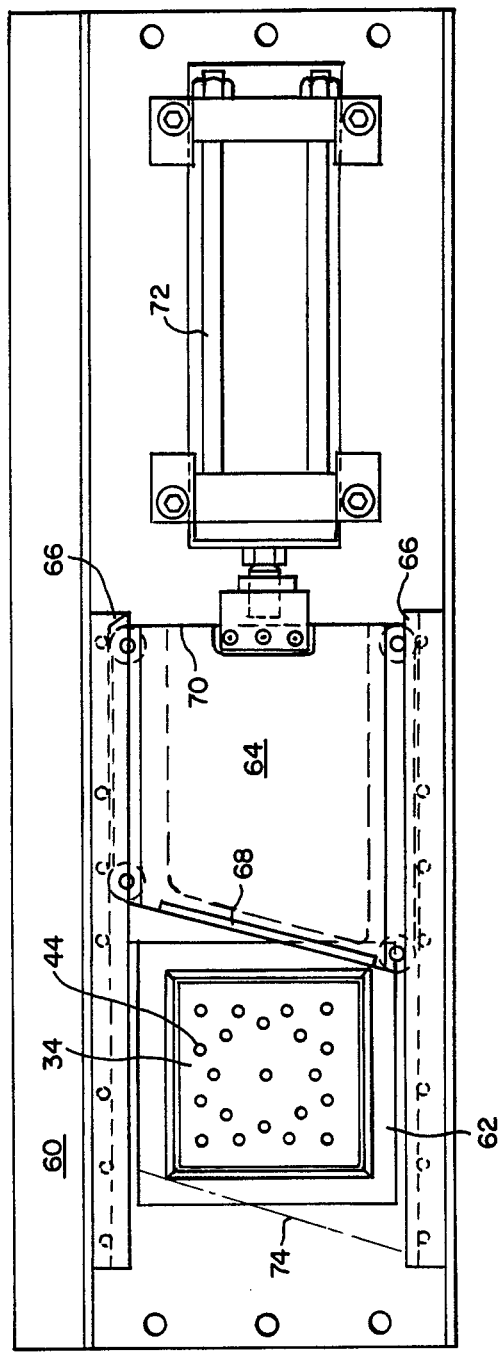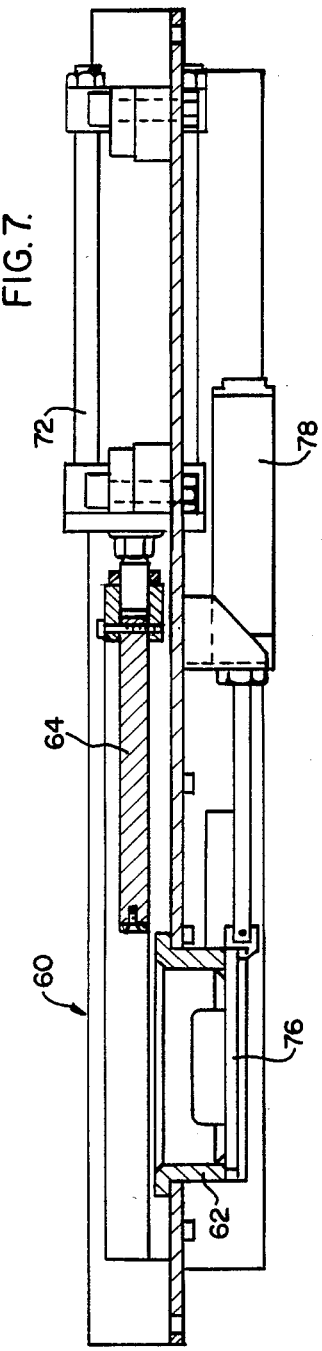
FIG. 6.
FIG. 7.

APPARATUS FOR DISMANTLING AND DISPOSING OF FUEL ASSEMBLIES

BACKGROUND OF THE INVENTION

1. Field of the Invention

This invention relates to apparatus and method for dismantling, shearing, and compacting a fuel assembly frame skeleton.

More particularly, the invention relates to apparatus and process for on-site storage and off-site disposal of the fuel assembly frame skeleton. More specifically, the invention is concerned with the compaction of the non-fuel bearing parts.

With this invention, remote dismantling of the fuel assembly frame skeleton is facilitated and the costs are reduced because the volume for eventual storage is reduced while the fuel rods and top nozzle can be removed and saved.

Heretofore, because of a lack of spent fuel reprocessing capability and lack of or insufficiency of Away-From-Reactor (AFR) storage facilities, it is necessary to have extended storage capability at reactor sites. This is presently being accomplished by storage-rack densification and trans-shipment between stations.

2. Description of the Prior Art

Both fuel assembly reconstitution and fuel assembly consolidation result in frame skeletons that must be disposed of.

It is, therefore, an object of this invention to reduce the volume of the skeletons and prepare them for permanent off-site disposal.

Methods and apparatus have been considered by others for the removal and disposal of unwanted materials both in the nuclear and non-nuclear field. Additionally, consideration has been given to the retention and saving of some of the components while at the same time disposing of the unwanted, unneeded, as well as undesired components.

As an example of a method for disposing of nuclear waste, although not particularly pertinent to the present invention, reference is made to U.S. Pat. No. 3,763,770 to Ehrman et al. which proposed a method for shearing spent nuclear fuel bundles into units of predetermined length and provided apparatus for carrying out the aforesaid method. This apparatus generally includes a pair of orthogonally related "gags" to clamp and collapse the bundle or a pair of parallely-acting horizontal gags cooperating with a vertical restraint for compressing predetermined lengths of the fuel bundles. Then a shear blade is used to sever predetermined lengths for dropping through a chute to a dissolution apparatus. The entire fuel bundle is merely collapsed and severed into smaller units for eventual disposal.

Also in the nuclear waste field, but not particularly pertinent to the present invention or the problems involved is the U.S. Pat. No. 4,056,052 to Weil et al., which is concerned with a method for shearing spent nuclear fuel assemblies of the shrouded pin-type wherein a plurality of long metal tubes packed with ceramic fuel are supported in a spaced-apart relationship. Spent fuel nuclear assemblies are first compacted between specially provided gag compactors into short segments so that they are amenable to chemical processing. Compression takes place so as to form the assemblies into specially formed compacts. Shearing then takes place with specially contoured blades which are adapted to mate with the contoured surface of the compacts of the compressed fuel assemblies.

There are other methods and apparatus for disposal of unwanted material, while retaining certain desired materials, and for this purpose reference is made to other patents which have no concept or appreciation of the problems involved with spent nuclear fuel assemblies, so that their solutions are of no help with the problems the present invention desires to overcome.

For example, U.S. Pat. No. 3,180,249 to Patros is concerned with compacting of scrap metal for steel mill consumption. This is a special process uniquely concerned solely with automobile bodies which are to be formed into scrap metal segments for cleaning prior to use in a steel mill. Here, there is no concern with bodies contaminated with nuclear material or nuclear waste material.

U.S. Pat. No. 3,367,019 to Williamson, U.S. Pat. No. 3,320,051 and U.S. Pat. No. 3,606,809 to Chazen are also all concerned with apparatus and methods for compacting and shearing scrap material such as automobile bodies.

However, none of the prior art known to the inventors is concerned with remotely dismantling and compacting an irradiated skeleton for off-site shipment or on-site storage.

It is therefore an object of the present invention to provide equipment which is capable of and usable for remotely dismantling and compacting a fuel assembly frame skeleton.

Another object of the present invention is to reduce the volume of the fuel skeleton.

A further object of the invention is the reduction of the fuel cell skeleton, which consists of everything composing the fuel cell assembly except the top nozzle and fuel rods, by a factor of four.

Yet another object of the invention is to carry out the process of reducing the fuel cell skeleton under water to provide protection against radiation.

SUMMARY OF THE INVENTION

The present invention provides for a system which uses an apparatus capable of hanging or being supported in the transfer canal of the spent fuel pit of the fuel handling building. This apparatus includes a bottom nozzle shear which is held within a frame or superstructure in the transfer canal, preferably under water to shear off the bottom nozzle and convey it to a scrap transfer bin or container via a chute, both of which are supported by the superstructure within the transfer canal. Then the remaining portion is brought to a skeleton compactor and a skeleton shear, also held by the superstructure under water. The compacted skeleton is sheared into a number of smaller portions which preferably have the following dimensions: 2"×10"×16".

During the compacting step, the skeleton is compacted so that a cross-section taken along its axial length is 2"×10".

After compacting and shearing into 16" lengths along the axial length of the skeleton, the individual portions are fed by means of another chute to the scrap transfer bin, also under water and supported by the superstructure. The compacted and sheared skeleton assembly may also be placed into a container which is adapted to hold four skeletons for off-site removal.

To these ends, the invention consists in the provision of a method for dismantling, shearing, and compacting a fuel assembly frame skeleton after removal of a top nozzle and fuel rods from the fuel assembly frame skeleton, which comprises the steps of firstly placing the frame skeleton into a bottom nozzle shear removal fixture and then removing the bottom nozzle from the frame skeleton, of secondly conveying the frame skeleton to a compactor after the removal of the bottom nozzle and then compacting the remainder of the frame skeleton, and of thirdly conveying the compacted frame skeleton to a skeleton shear and shearing the compacted frame skeleton into pieces.

The invention is also concerned with apparatus for dismantling, shearing, and compacting a fuel assembly frame skeleton which comprises a bottom nozzle removal device including a guillotine blade for severing the bottom nozzle from thimble tubes and grids of the fuel assembly frame skeleton, a compactor for compacting the remainder of the frame skeleton after the bottom nozzle has been removed to a width which is substantially less than the original width in cross-section in a direction orthogonal to the longitudinal axis of the frame skeleton, and a skeleton shear for shearing the compacted skeleton into pieces of a shorter length than the original length in the longitudinal direction.

In addition, a superstructure is provided which is adapted for positioning in a transfer canal of a fuel handling building adjacent to the spent fuel pit contained therein, and a conveyor is operatively associated with the superstructure and the spent fuel pit as well as the transfer canal for conveying the frame skeleton assembly from the fuel pit to the superstructure after the top nozzle and fuel rods are removed in the fuel pit from the fuel assembly frame skeleton, the conveyor also cooperating with the bottom nozzle removal device, the compactor and the skeleton shear for transfer of the frame skeleton from one to the other in the process of reducing the volume of the frame skeleton.

Other objects, advantages and nature of the invention will become readily apparent to those skilled in the art when considering the drawings and the accompanying description thereof which sets forth the presently preferred mode of carrying out the invention.

BRIEF DESCRIPTION OF THE DRAWINGS

FIG. 6 is a plan view of the bottom nozzle-removal fixture of a spent fuel skeleton disassembly apparatus with the fuel cell assembly skeleton lowered and in place on the bottom nozzle-removal fixture;

FIG. 7 is an elevational view in section of the bottom nozzle-removal fixture of FIG. 6, but omitting the fuel cell assembly skeleton for purposes of simplicity;

DESCRIPTION OF THE PREFERRED EMBODIMENTS

Figure 1:
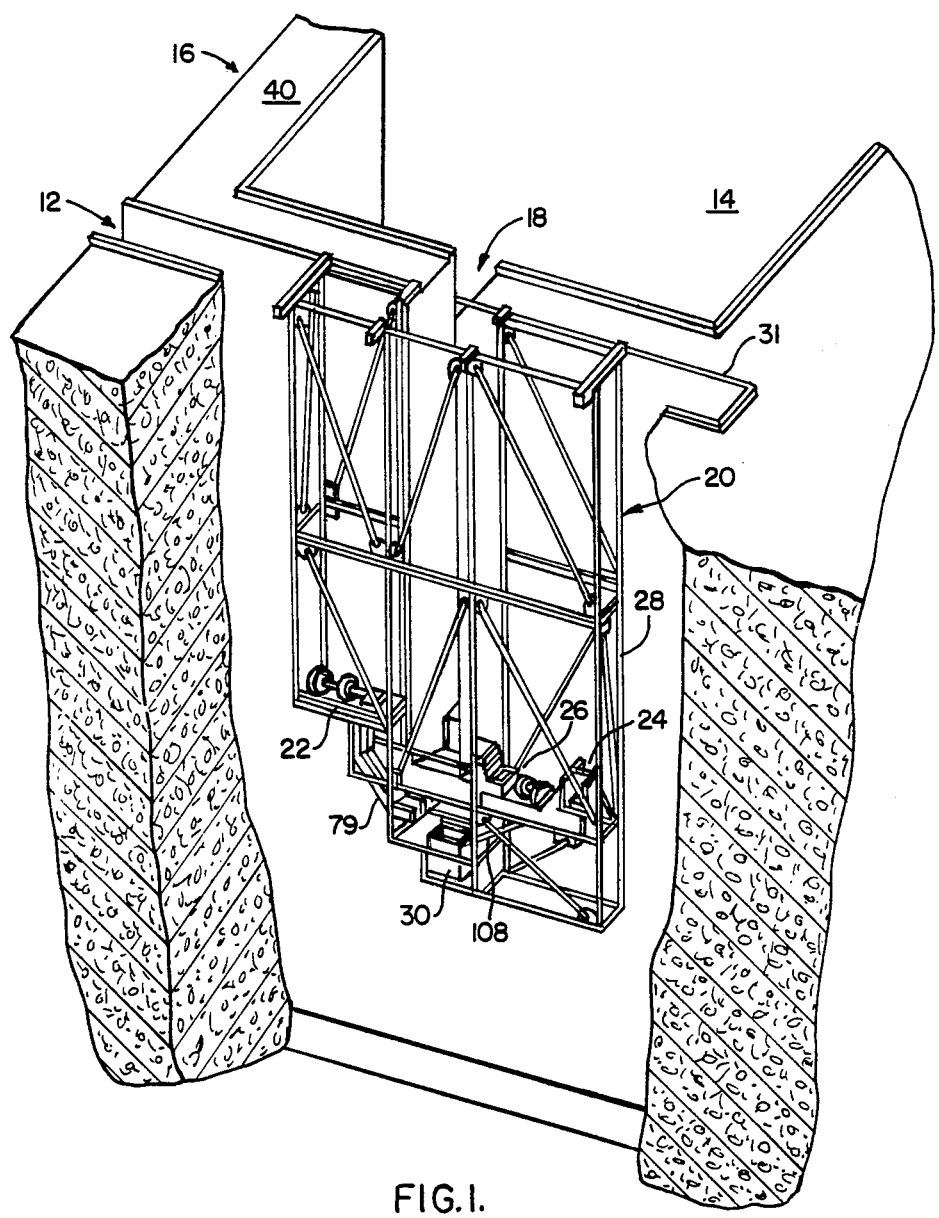
FIG. 1 is a schematic perspective view illustrating the general arrangement of a single station containing a spent fuel skeleton disassembly apparatus including cutting and compaction equipment supported by a frame for compacting a fuel cell assembly frame skeleton after all the fuel rods are removed and includes a bottom nozzle-removal fixture, a compactor and a shear, all positioned desirably within the fuel transfer canal of the fuel handling building with the bottom portion of the fixture enclosed on the sides and bottom to prevent any debris from falling into the fuel transfer canal.

Referring now more particularly to the accompanying drawings which show the presently preferred mode of carrying out the invention, a spent fuel assembly, or more particularly, a fuel cell assembly 2 including fuel rods 6, top nozzle 8 and fuel cell assembly frame skeleton 10 (FIG. 2) is intended to hang in the transfer canal 12 (FIG. 1) adjacent to the spent fuel pit 14 of the fuel-handling building 16. Connecting fuel transfer canal 12 and spent fuel pit 14 is fuel handling slot 18.

Figure 3:
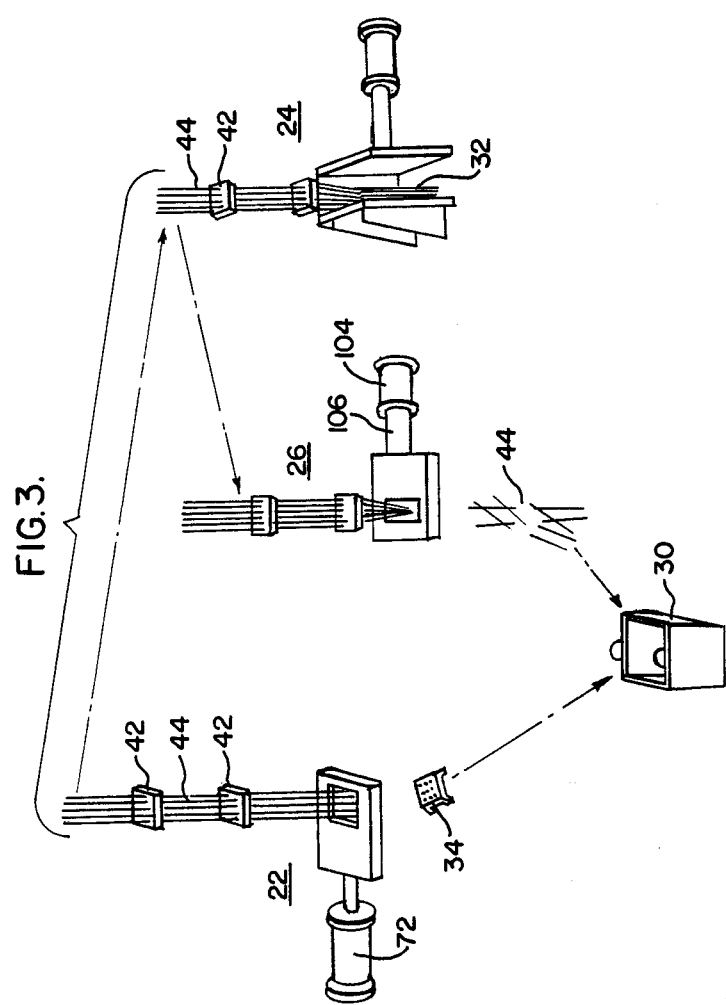
FIG. 3 is a schematic arrangement illustrating the steps in the compaction process after all the fuel rods have been removed from the fuel cell assembly to leave the fuel cell frame assembly skeleton, as shown in FIG. 2, which is then placed into a nozzle-removal fixture for removal of the bottom nozzle and then dropping it into a scrap storage bin, and then the remaining parts consist of a unit of thimble tubes and grids which is moved into the compactor for compaction, and then after compaction, the unit is moved to a shear which cuts the compacted thimble tubes and grids to form smaller units for deposit into the scrap storage bin.
Figure 2:
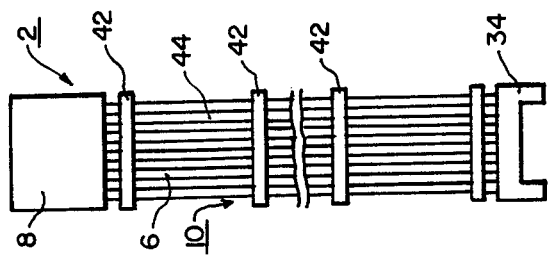
FIG. 2 is an elevational view of a fuel cell frame assembly skeleton.

In FIG. 1, there is shown a spent fuel skeleton disassembly apparatus station or skeleton conveyor and reduction system 20, which generally includes as components a nozzle shear or removal fixture 22, a compactor 24, and a skeleton shear 26. All of the aforesaid components are supported within a frame 28 which hangs from the curb 31 of the transfer canal 12 of the spent fuel pit 14. A transfer container or scrap storage bin 30 is supported at the bottom of the frame 28 to receive compacted skeleton pieces 32 (see FIG. 3) and the bottom nozzle 34.

Figure 5:
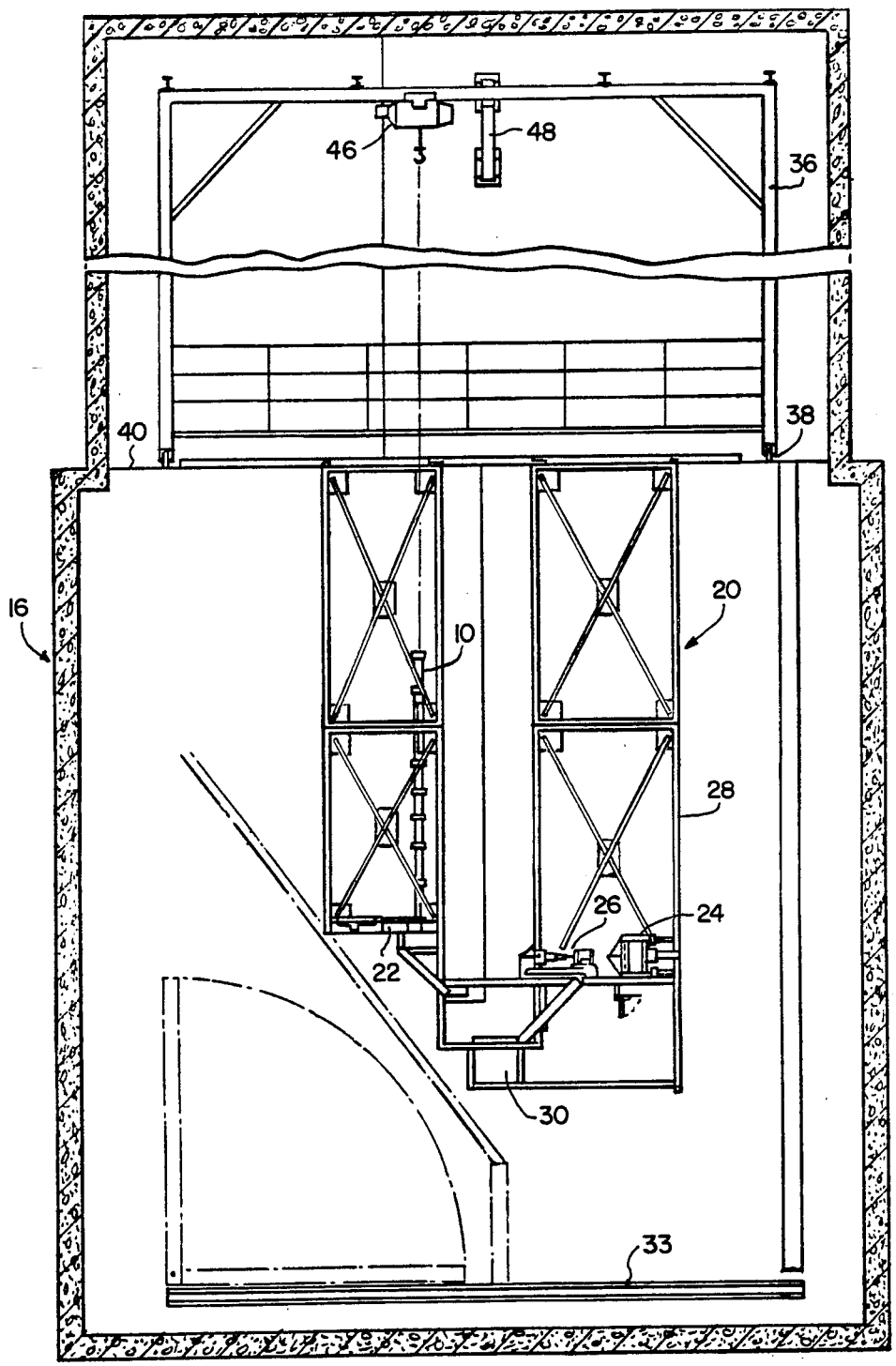
FIG. 5 is a sectional view taken on line 5—5 of FIG. 4 illustrating an overhead crane mechanism positioned above the fuel skeleton disassembly station or conveyor system for taking the fuel cell assembly frame skeleton, after the fuel rods have been removed therefrom, from the fuel pit to the spent fuel skeleton disassembly station.

Spent fuel assemblies 2 are dismantled, and the fuel rods 6 and top nozzle 8 are removed therefrom to leave the fuel cell frame skeleton 10 in spent fuel pit 14. A crane mechanism 36 (FIG. 5) is slidable on casters 38 along and on top of ledges or wall 40 to the transfer canal 12, adjacent the spent fuel pit 14, to raise the fuel cell assembly frame skeleton 10 from the fuel pit 14 and move it to the skeleton conveyor and reduction apparatus 20.

Removal of the top nozzle 8 and fuel rods 6 leaves the grids 42 and thimble tubes 44 which are supported by jib crane 46 which is adapted to carry various long handled tools for manipulating skeleton 10 in apparatus 20 as skeleton 10 is moved from station to station. Crane mechanism 36 is guided for its movement from above fuel pit 14 to transfer canal 12 by means of a chain-track guide 48.

Figure 4:
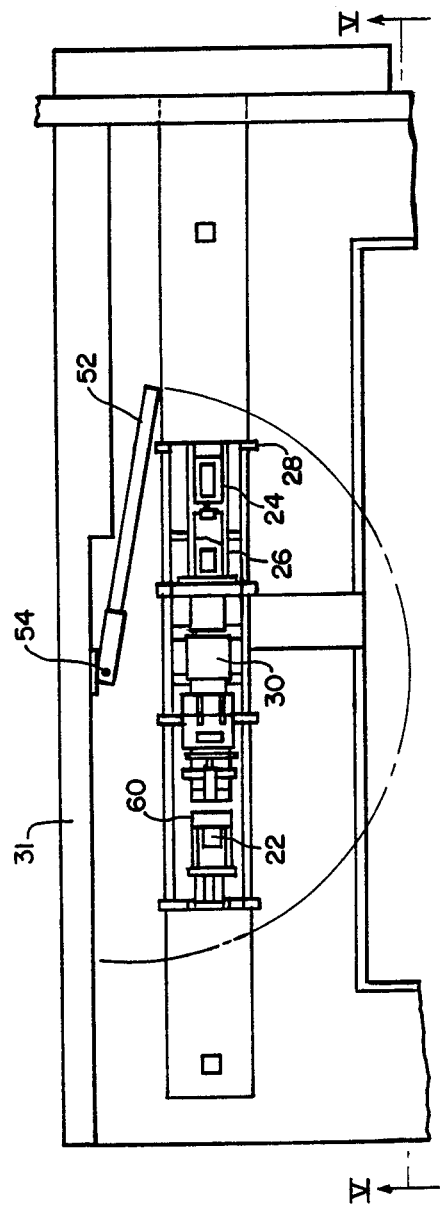
FIG. 4 is a partial plan view of the fuel cell assembly frame skeleton looking downwardly into the fuel transfer canal as shown in FIG. 1.

After all the fuel rods 6 have been removed from fuel cell assembly 2 and reinserted into a new skeleton or other storage container (not shown), skeleton 10 is lifted by a long-handled tool held by jib crane 46. The long-handled tool also may be suspended from the spent fuel pit bridge or a wall of the spent fuel pit 14. Then skeleton 10 can be picked up by a floor or wall-mounted jib crane 52 (FIG. 4) and transferred to apparatus 20.

The jib crane 52 may be in the form of a long-armed crane which is pivoted on a pivot connection such as pivot connection 54 on ledge or curb 31 adjacent to transfer canal 12, and may be pivoted over the canal and assembly 20 towards fuel pit 14 to pick up skeleton 10 and place it into assembly 20 for compaction.

The bottom 33 of transfer canal 12 is desirably 30 feet below curb 31, and the bottom of the spent fuel pit 14 is about 40 feet below curb 31.

Referring now more particularly to FIGS. 6 and 7, bottom nozzle shear or removal fixture 22 generally includes a frame structure 60 carrying a bottom nozzle support 62 for supporting bottom nozzle 34 after frame skeleton 10 is lowered by crane mechanism 36 or long arm 52 into frame structure 60. Also supported for movement transversely to the longitudinal axis of the thimble tubes 44, when bottom nozzle 34 is on support 62, is a guillotine blade 64 slidably arranged for controlled and guided movement in oppositely arranged spaced guide and support channels or guideways 66. The front end 68 is angled to its direction of movement, and the rear end 70 is connected with hydraulic cylinder 72 which, when actuated, moves to the dot-dashed position 74 of blade 64 across the top of bottom nozzle 34 for separation thereof from thimbles 44. After bottom nozzle 34 is severed, when blade 64 is moved to its dot-dashed position 74, bottom door 76 is operated by air cylinder 78 to permit nozzle 34 to drop out of bottom nozzle support 62 into container 30 by means of chute or slide 79 (FIG. 1).

Guillotine blade 64 is strong enough to shear off the bottom nozzle by brute force, free of flying materials.

The remainder of skeleton 10 which now consists of only thimble tubes 44 and grids 42 is then moved by crane mechanism 36 into position above compactor 24. At this station, the remainder of skeleton 10 is reduced in width from about 8.5 inches to about 2 inches.

Figure 8:
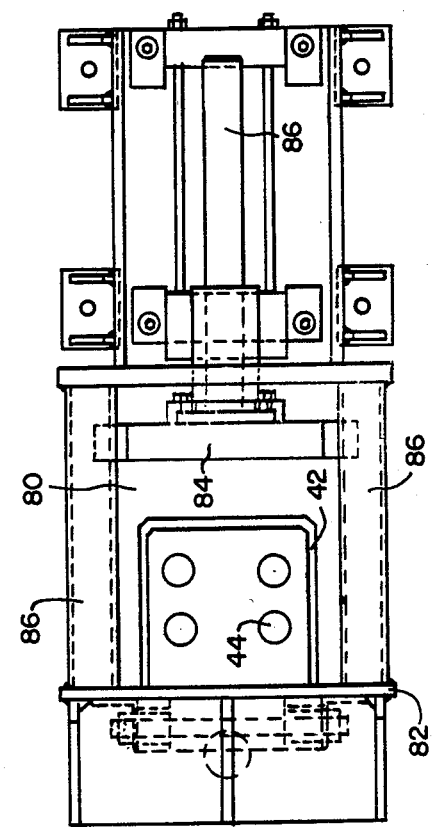
FIG. 8 is a plan view of the compactor with parts remaining from the skeleton after removal from the bottom nozzle-removal fixture in place for compaction.
Figure 9:
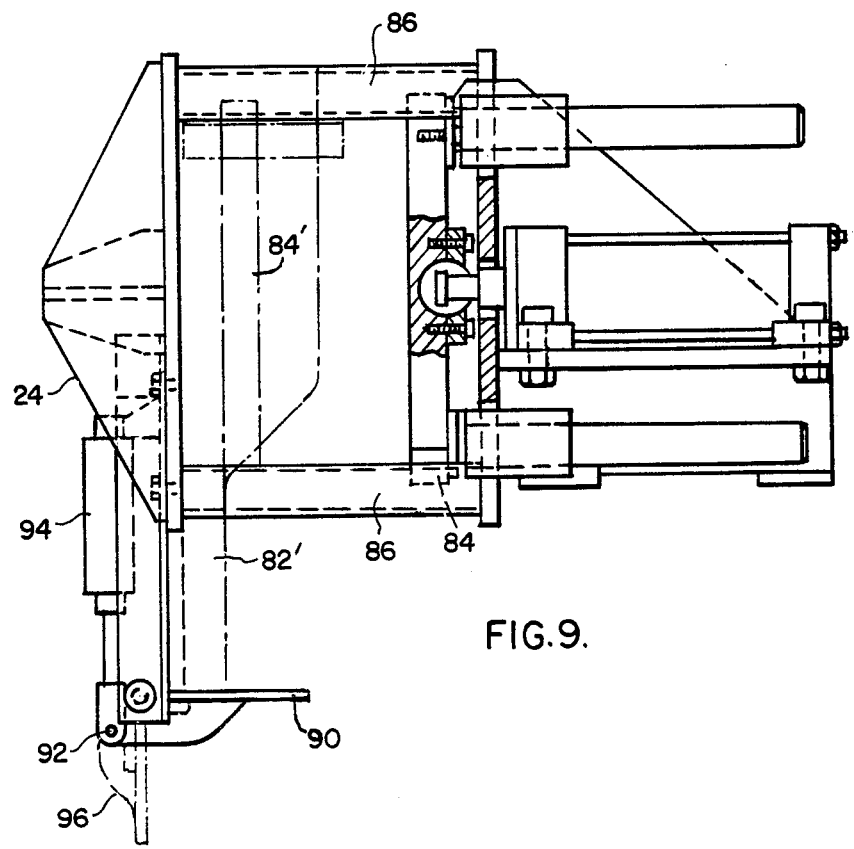
FIG. 9 is an elevational view, partly in section of the compactor of FIG. 8 without the partial skeleton.

Referring now more particularly to FIGS. 8 and 9, compactor 24 includes a receiving area 80 for receiving the remainder of skeleton 10 composed of grids 42 and thimble tubes 44. Receiving area 80 is surrounded by a bearing plate 82 on one side and opposite thereto is a ram plate 84 which is guided for movement by guideways or guide bars 86. Ram plate 84 is movable from its position shown in full outline to the position shown in dot-dashed outline 84'.

In order to compact the last short section of the remainder of skeleton 10, when it is released from the crane mechanism or handling tool held by long-armed crane 52 or crane mechanism 36, temporary support 90 is provided which is pivotally connected at pivot 92 to compactor 24 and is swung into place by means of air cylinder 94 when actuated from its neutral position 96 indicated in dashed outline.

Figure 10:
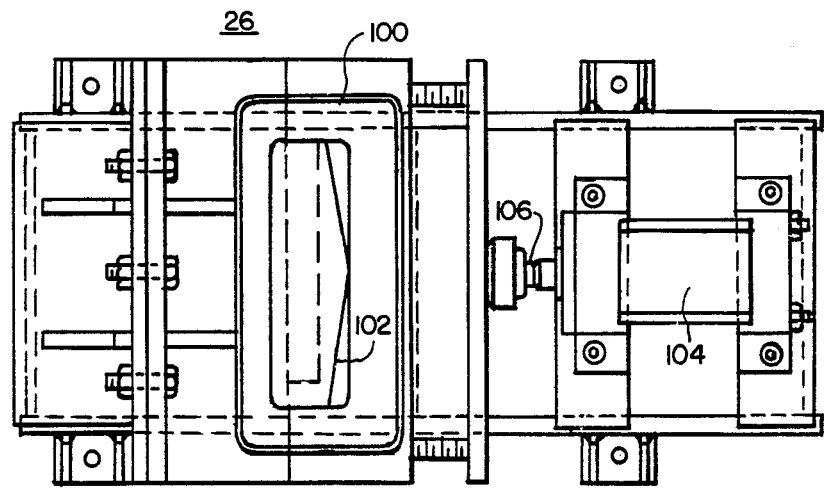
FIG. 10 is a plan view of the shear for shearing the remaining part of the skeleton after the bottom nozzle has been removed.
Figure 11:
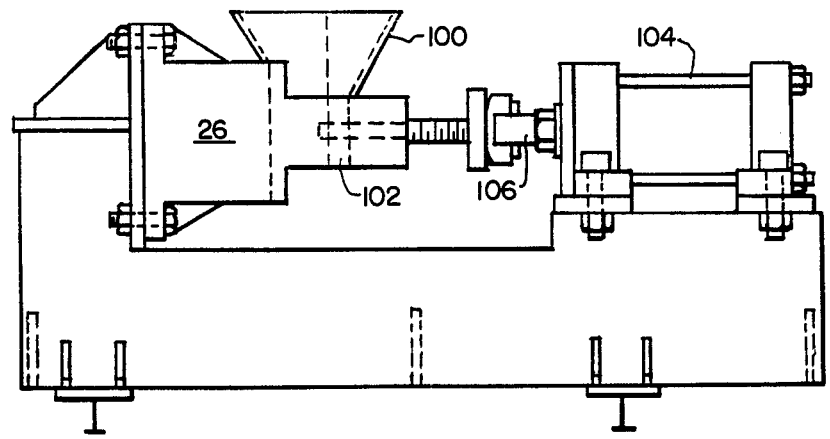
FIG. 11 is an elevational view of the shear of FIG. 10.

Referring now to FIGS. 10 and 11, crane mechanism 36 or long-armed crane 52 moves the compacted assembly to skeleton shear 26, or shear for the skeleton unit after the bottom nozzle has been removed, which includes a funnel-shaped member or container 100 with a shear blade 102 and a hydraulic cylinder 104 connected to blade 102 by means of connecting rod 106 connected at one end to blade 102 and the other end to hydraulic cylinder 104. The individual operating parts and movement means of the skeleton shear are conventional. Blade 102 is contoured to sever the thimble tubes to form small units for placement into scrap storage bin 30. After the shear blade 102 cuts the thimbles into short pieces, they fall down a chute 108 (FIG. 1) and end up in a temporary scrap storage bin or transfer container 30.

When the spent fuel skeleton disassembly station is positioned in the transfer canal 12, water, although not shown, is contained therein, and it is desirably maintained to a level of about 8 inches below edge or curb 31.

The frame or superstructure 28 is desirably made to fill within the transfer canal 12, and it is suitably enclosed to prevent debris from falling into the canal or the disassembly apparatus 20.

When carrying out the method, it is preferred that the skeleton assembly 10 in its various stages of processing be held by the crane mechanism 36 or long-armed crane 54 as the assembly is moved from compactor 24 to skeleton shear 26. Cutting of the thimble tubes 44 preferably takes place at or near a grid 42. The crane should be preferably 20 feet above curb 31 to provide for ease of transfer from spent fuel pit 14 to transfer canal 12. Cutting should desirably take place along a plane which is perpendicular or orthogonally related to the longitudinal axis of the fuel cell assembly 2.

In some instances, it may be desired to save the bottom nozzle, and for this purpose frame structure 28 may be provided with another container such as container 30 adjacent chute 79 so as to separate the bottom nozzles from the remainder of skeleton which is to be compacted and disposed of separate from the bottom nozzle.

In order to remove the top nozzle, the thimble tubes 44 are severed from the top nozzle 8 by cutting the thimble tubes from the top nozzle to expose the fuel rods. The fuel rods are then removed from the bottom nozzle grid assembly. In many instances, the top nozzle 8 and the fuel rods 6 can be reused, and the cutting to remove top nozzle 8 is carried out in the fuel pit 14.

While there has been shown and described what is considered to be the presently preferred mode of carrying out the invention, it will be obvious to those skilled in the art that various changes and modifications may be made therein without departing from the scope of the invention.

We claim:

1. Apparatus for dismantling, shearing, and compacting an elongated fuel assembly frame skeleton remaining after removal of a top nozzle and fuel rods of a nuclear fuel assembly, comprising:

a superstructure adapted for positioning, substantially underwater, in a transfer canal of a fuel handling building of a nuclear power generating facility, adjacent to a spent fuel pit contained therein;

bottom nozzle removal operating means contained within the superstructure supported at a level below the surface water level of the transfer canal, the bottom nozzle removal operating means including a guillotine blade for severing a bottom nozzle from thimble tubes and grids of the fuel assembly frame skeleton;

compactor operating means supported within said superstructure at a level below the surface of the water level of the transfer canal for compacting the remainder of the frame skeleton after the bottom nozzle has been removed and prior to shearing thereof, to a width which is substantially less than the original width in cross-section in a directional orthogonal to the longitudinal axis of the frame skeleton;

skeleton shear operating means supported by said superstructure below the surface level of the water in the transfer canal for shearing the compacted skeleton into pieces of a shorter length than the original length in the longitudinal direction;

conveyor means operatively associated with said superstructure, the spent fuel pit and the transfer canal for conveying the frame skeleton from the fuel pit to said superstructure after the top nozzle and the fuel rods are removed in the fuel pit from the fuel assembly, said conveyor means also cooperating with the bottom nozzle removal operating means, the compactor operating means and the shear operating means for transferring the frame skeleton from one of the aforementioned operating means to another;

a transfer container for receiving the severed bottom nozzle and sheared sections of the frame skeleton assembly;

a first chute connected between the bottom nozzle removal operating means and the transfer container for transferring the severed bottom nozzle to the transfer container; and a second chute connected between the skeleton shear operating means and the transfer container for transferring the severed sheared skeleton sections to the transfer container.

2. Apparatus as claimed in claim 1 wherein the bottom nozzle operating means includes:

a bottom nozzle support;

the guillotine blade for shearing the bottom nozzle;

guides for supporting the guillotine blade for movement in the direction transversely to the longitudinal direction of the fuel assembly frame skeleton;

air cylinder means connected with said guillotine blade for movement thereof in said traverse direction for severing the thimble tubes and grids from the bottom nozzle; and bottom door means forming part of the bottom nozzle support and air cylinder operating means therefor for opening the bottom door to permit the severed bottom nozzle to fall out of the bottom nozzle support.

3. Apparatus as claimed in claim 1 wherein the skeleton shear operating means includes:

a funnel for receiving the compacted skeleton frame assembly;

a contoured shear blade and guide means therefor operatively associated with the funnel at a height to aid the compacted skeleton assembly into selectively sized pieces; and hydraulic actuated means connected with the shear blade for movement thereof transversely to the longitudinal direction of the skeleton assembly.

* * * * *